US010487790B1

(12) United States Patent
Siddiqui et al.

(10) Patent No.: US 10,487,790 B1
(45) Date of Patent: Nov. 26, 2019

(54) VEHICLE AND ENGINE START/STOP METHOD FOR A VEHICLE

(71) Applicant: FORD GLOBAL TECHNOLOGIES, LLC, Dearborn, MI (US)

(72) Inventors: Siraj Siddiqui, Lasalle (CA); Ahmed Awadi, Farmington Hills, MI (US); Hafiz Shafeek Khafagy, Dearborn, MI (US); Hussam Makkiya, Dearborn, MI (US); Andrew Moen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 16/019,017

(22) Filed: Jun. 26, 2018

(51) Int. Cl.
*F02N 11/08* (2006.01)
*B60W 10/11* (2012.01)
*B60W 10/06* (2006.01)
*B60W 20/30* (2016.01)
*B60W 20/40* (2016.01)
(Continued)

(52) U.S. Cl.
CPC ......... *F02N 11/0822* (2013.01); *B60W 10/06* (2013.01); *B60W 10/11* (2013.01); *B60W 20/30* (2013.01); *B60W 20/40* (2013.01); *B60W 30/18018* (2013.01); *B60W 30/18054* (2013.01); *F02N 11/0844* (2013.01); *B60W 2422/50* (2013.01); *B60W 2510/205* (2013.01); *F02D 41/042* (2013.01); *F02N 2200/0802* (2013.01); *F02N 2200/0808* (2013.01); *Y02T 10/48* (2013.01)

(58) Field of Classification Search
CPC ......... F02N 11/0822; F02N 2200/0802; F02N 2200/0808; F02N 11/0844; B60W 30/18054; B60W 20/30; B60W 20/40; B60W 10/11; B60W 30/18018; B60W 10/06; B60W 2510/205; B60W 2422/50; F02D 41/042; Y02T 10/48
USPC .............................. 123/179.4; 701/102–113
See application file for complete search history.

(56) References Cited

U.S. PATENT DOCUMENTS 7,115,068 B2 * 10/2006 Braun ...................... B60K 6/48
477/99
8,702,563 B1 * 4/2014 Sangameswaran ... B60W 10/06
477/111

(Continued)

FOREIGN PATENT DOCUMENTS

EP        1052399 A2 * 11/2000  .......... F02N 11/0833
WO     2017157657 A1    9/2017

*Primary Examiner* — Sizo B Vilakazi
*Assistant Examiner* — Brian R Kirby
(74) *Attorney, Agent, or Firm* — David Kelley; Brooks Kushman P.C.

(57) ABSTRACT

A vehicle start/stop method includes inhibiting auto-stopping an engine responsive to an engine auto-stop command, activating a transmission gear shifter, and a rotational speed of a steering wheel being less than a threshold; auto-stopping the engine responsive to the engine auto-stop command, activating the gear shifter, and the rotational speed being greater than the threshold; auto-starting the engine responsive to activating the gear shifter and the rotational speed being less than the threshold while the engine is auto-stopped; and inhibiting auto-starting the engine responsive to activating the gear shifter and the rotational speed being greater than the threshold while the engine is auto-stopped.

20 Claims, 2 Drawing Sheets

(51) Int. Cl.
 *B60W 30/18* (2012.01)
 *F02D 41/04* (2006.01)

(56) References Cited

U.S. PATENT DOCUMENTS

| | | | | |
|---|---|---|---|---|
| 8,788,178 B2* | 7/2014 | Pebley | ................ | F02N 11/084 |
| | | | | 701/101 |
| 9,043,119 B2* | 5/2015 | Horii | ................ | F02D 29/02 |
| | | | | 701/102 |
| 2005/0051125 A1* | 3/2005 | Braun | ................ | B60K 6/48 |
| | | | | 123/179.3 |
| 2007/0272187 A1* | 11/2007 | Celisse | ................ | F02N 11/0833 |
| | | | | 123/179.4 |
| 2011/0046864 A1* | 2/2011 | Kamiya | ................ | F02N 11/0833 |
| | | | | 701/102 |
| 2011/0112740 A1* | 5/2011 | Hashimoto | ................ | F02D 17/02 |
| | | | | 701/70 |
| 2011/0238284 A1* | 9/2011 | Bollig | ................ | B60W 10/06 |
| | | | | 701/113 |
| 2012/0132176 A1* | 5/2012 | Sawada | ................ | F02N 11/0837 |
| | | | | 123/339.14 |
| 2013/0245925 A1* | 9/2013 | Malone | ................ | F02N 11/0818 |
| | | | | 701/113 |
| 2015/0211468 A1* | 7/2015 | Ezumi | ................ | F02N 11/0825 |
| | | | | 701/112 |
| 2016/0023652 A1* | 1/2016 | Soo | ................ | B60W 20/20 |
| | | | | 701/22 |
| 2016/0069317 A1* | 3/2016 | Koibuchi | ................ | F02N 11/0833 |
| | | | | 701/112 |
| 2016/0160999 A1* | 6/2016 | Kinoshita | ................ | F16H 61/16 |
| | | | | 477/97 |
| 2016/0265654 A1* | 9/2016 | Jerger | ................ | F16H 59/0204 |
| 2016/0290264 A1* | 10/2016 | Oda | ................ | F02D 41/042 |
| 2017/0074189 A1* | 3/2017 | Oda | ................ | B60W 10/06 |
| 2017/0313316 A1* | 11/2017 | Shiraishi | ................ | B60W 10/06 |
| 2018/0223788 A1* | 8/2018 | Gerty | ................ | F02N 11/0844 |

* cited by examiner

VEHICLE AND ENGINE START/STOP METHOD FOR A VEHICLE

TECHNICAL FIELD

The present disclosure relates to control systems for vehicle engines.

BACKGROUND

Hybrid and micro-hybrid vehicles may include control systems that are configured to shut down the engine of the vehicle in order increase fuel economy and reduce emissions.

SUMMARY

A vehicle includes an engine, a steering wheel, and a controller. The steering wheel has a transmission gear shifter disposed thereon. The controller is programmed to, responsive to an engine auto-stop command, activating the gear shifter, and a rotational speed of the steering wheel being less than a threshold, inhibit auto-stopping the engine. The controller is further programmed to, responsive to the engine auto-stop command, activating the gear shifter, and the rotational speed being greater than the threshold, auto-stop the engine.

A vehicle includes an engine, a steering wheel, and a controller. The steering wheel has a transmission gear shifter disposed thereon. The controller is programmed to, responsive to activating the gear shifter and a rotational speed of the steering wheel being less than a threshold while the engine is auto-stopped, auto-start the engine. The controller is further programmed to, responsive to activating the gear shifter and the rotational speed being greater than the threshold while the engine is auto-stopped, inhibit auto-starting the engine.

A vehicle start/stop method includes inhibiting auto-stopping an engine responsive to an engine auto-stop command, activating a transmission gear shifter, and a rotational speed of a steering wheel being less than a threshold; auto-stopping the engine responsive to the engine auto-stop command, activating the gear shifter, and the rotational speed being greater than the threshold; auto-starting the engine responsive to activating the gear shifter and the rotational speed being less than the threshold while the engine is auto-stopped; and inhibiting auto-starting the engine responsive to activating the gear shifter and the rotational speed being greater than the threshold while the engine is auto-stopped.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
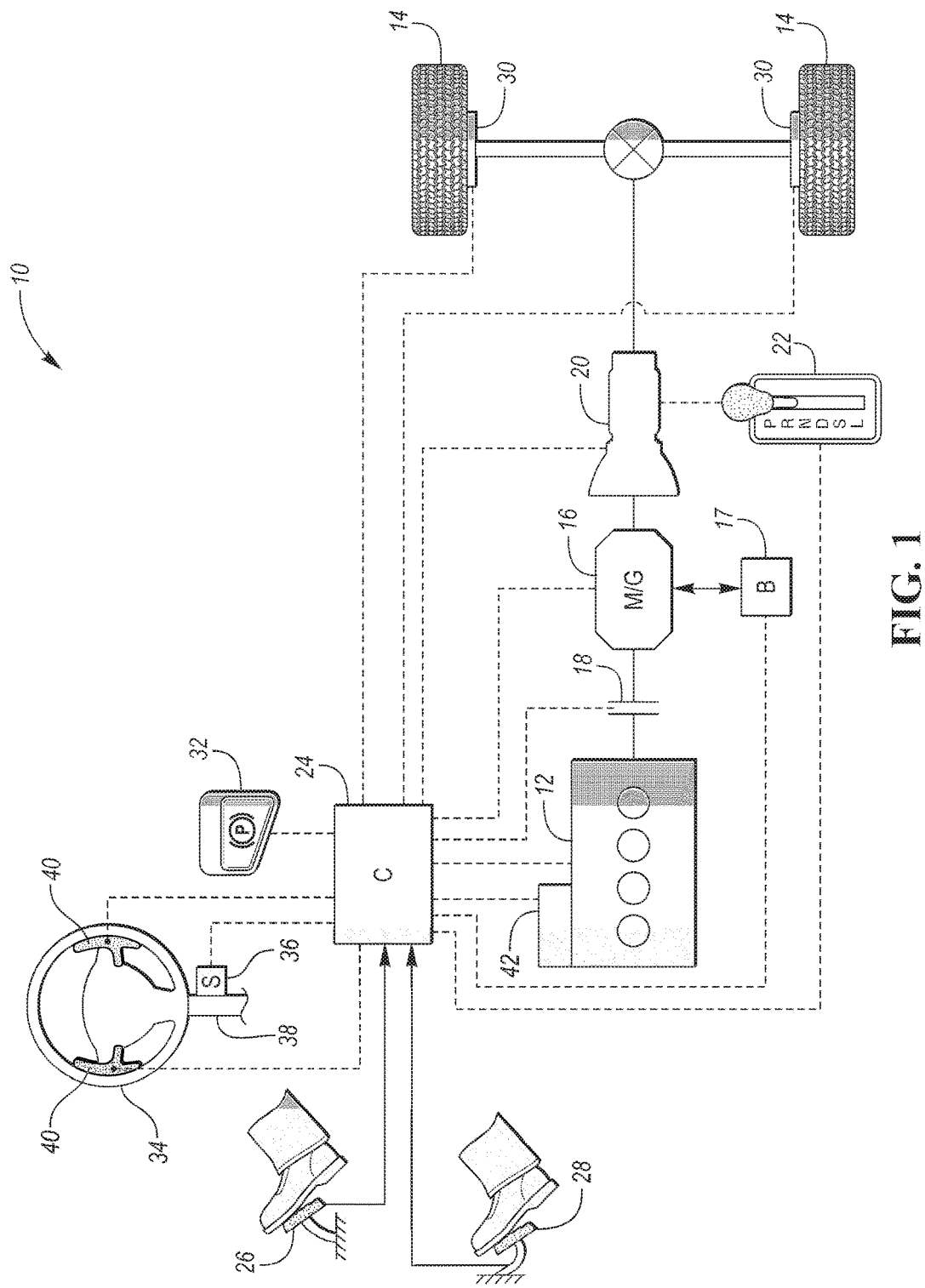
FIG. 1 is a schematic diagram representative of a vehicle and a vehicle powertrain.

Referring to FIG. 1, a diagram representative of a vehicle 10 and a vehicle powertrain is illustrated. The vehicle 10 includes an engine 12 that is configured to transmit power through the powertrain and to at least one drive wheel 14. The vehicle 10 may be a hybrid vehicle that includes a motor/generator (M/G) 16 that is also configured to transmit power through the powertrain and to at least one drive wheel 14. The M/G 16 may be configured to operate as both a motor and a generator. When operating as a motor, the M/G 16 may receive electrical power from a traction battery 17. When operating as a generator the M/G 16 may deliver electrical power to the traction battery 17 in order to recharge the traction battery 17. The engine 12 may be configured to selectively couple to and decouple from the powertrain through an engine disconnect clutch 18. The powertrain may also include a transmission (or gearbox) 20. The transmission 20 may be an automatic transmission that includes gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft and a transmission input shaft.

The transmission 20 may also include a gear selector 22 allows an operator to shift the transmission 20 between park (P), reverse (R), neutral (N), drive (D), sport (S), and low gear (L) positions. The gear selector 22 may include a mechanical connection that selects the desired gear position or may be a shift-by-wire gear selector that sends a signal to the transmission 20 (or a controller thereof) to shift the transmission 20 between the park (P), reverse (R), neutral (N), drive (D), sport (S), and low gear (L) positions. The signal sent from the gear selector 22 may be an electrical signal that is transmitted to the transmission 20 via an electrical wire or may be a wireless signal that is transmitted to the transmission 20 via a wireless transmitter. Wireless communications may be made via any known wireless technology known in the art. The gear selector 22 may be a lever, dial, one or more push buttons, touch screen, or any other user interface known in the art that may be utilized as a gear selector. The gear selector 22 may be a combination of any of the user interfaces know in the art.

The powertrain further includes an associated controller 24 such as a powertrain control unit (PCU). While illustrated as one controller, the controller 24 may be part of a larger control system and may be controlled by various other controllers throughout the vehicle 10, such as a vehicle system controller (VSC). It should therefore be understood that the controller 24 and one or more other controllers can collectively be referred to as a "controller" that controls various actuators in response to signals from various sensors to control functions such as starting/stopping the engine 12, operating the M/G 16 to provide wheel torque or charge a battery, select or schedule shifts of the transmission 20, transition the transmission 20 to the desired gear based on an input from the gear selector 22, open/close the engine disconnect clutch 18, etc. The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 12 or vehicle 10.

Control logic or functions performed by the controller 24 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 24. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 26 may be used by the operator of the vehicle 10 to provide a demanded torque, power, or drive command to propel the vehicle 10. In general, depressing and releasing the accelerator pedal 26 generates an accelerator pedal position signal that may be interpreted by the controller 24 as a demand for increased power or decreased power, respectively. A brake pedal 28 may also be used by the operator of the vehicle 10 to provide a demanded braking torque to slow the vehicle. In general, depressing the brake pedal 28 generates a brake pedal position signal that may be interpreted by the controller 24 as a demand to decrease the vehicle speed. Based upon inputs from the accelerator pedal 26 and brake pedal 28, the controller 24 commands the torque to the engine 12, M/G 16, and/or friction brakes 30.

The friction brakes 30 may include an electronic parking brake. The electronic parking brake may be activated by the controller 24 depending on specific conditions of the vehicle 10. The electronic parking brake may also be activated when the vehicle operator selects to activate the electronic parking brake through a user interface 32. The user interface 32 may be a push button that activates an electronic switch to engage the electronic parking brake.

The vehicle 10 may include a steering wheel 34 that is configured to steer a pair of front wheels (not shown). A sensor 36 may be disposed about a steering column 38. The sensor 34 may be configured to detect an angular displacement of the steering wheel 34 and/or an angular velocity (i.e., rotational speed) of the steering wheel 34. The sensor 36 may be configured to communicate with the controller 24 such that the controller 24 receives signals from the sensor 36 that are indicative of the angular displacement and/or the angular velocity of the steering wheel 34.

One or more gear shifters 40 that allow an operator of the vehicle 10 to manually shift between the gears (i.e., $1^{st}$, $2^{nd}$, $3^{rd}$, etc. gears) of the transmission 20 may be disposed on the steering wheel 34. More specifically, the one or more gear shifters 40 may include a pair of paddle shifters where activation or engagement of one of the paddle shifters is configured to trigger a downshift of the transmission 20 while activation or engagement of the other of the paddle shifters is configured to trigger an upshift of the transmission 20. The one or more gear shifters 40 may be configured to communicate with the controller 24 such that the controller 24 receives signals indicative of an upshift or a downshift, which is then communicated to the transmission 20 to cause the upshift or downshift.

The engine 12 may be configured to auto-start or auto-stop based on various conditions of vehicle 10. The controller 24 may command a starter motor (which alternatively may be an integrated starter/generator) 42 to turn the crankshaft of the engine 12 in order to start the engine 12. Alternatively, the controller 24 may command the M/G 16 to turn the crankshaft of the engine 12 by closing the engine disconnect clutch 18.

The controller 24 may be configured to receive various states or conditions of the various vehicle components illustrated in FIG. 1 via electrical signals. The electrical signals may be delivered to the controller 24 from the various components via input channels. Additionally, the electrical signals received from the various components may be indicative of a request or a command to change or alter a state of one or more of the respective components of the vehicle 10. The controller 24 includes output channels that are configured to deliver requests or commands (via electrical signals) to the various vehicle components. The controller 24 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described herein is merely exemplary and is not intended to be limiting. Other non-hybrid or hybrid vehicle configurations should be construed as disclosed herein. Other vehicle configurations may include, but are not limited to, vehicles powered only by an internal combustion engine, micro-hybrid vehicles (i.e., vehicles that are powered by an internal combustion engine that includes a start/stop system), series hybrid vehicles, parallel hybrid vehicles, series-parallel hybrid vehicles, or any other vehicle configuration known to a person of ordinary skill in the art.

It should further be understood that although a rear wheel drive configuration is depicted herein, other powertrain/drivetrain configurations should be construed as disclosed herein. Other powertrain/drivetrain configurations may include, but are not limited to, front wheel drive powertrains/drivetrains, all-wheel drive powertrains/drivetrains, powertrain/drivetrain configurations that are capable of transitioning between two-wheel and four-wheel drive modes, or any other powertrain/drivetrain configuration known to a person of ordinary skill in the art.

Engine start/stop systems automatically stop an internal combustion engine of a vehicle during periods where the engine would otherwise idle in order to reduce emissions and increase fuel economy. Engine start/stop systems are also configured to automatically restart the engine when necessary. It may be necessary to restart the engine per a driver torque demand (i.e., a depression of an accelerator pedal) or based on some other vehicle system demand. In vehicles that include an automatic transmission, releasing a brake pedal and/or depressing an accelerator pedal may be a trigger condition for auto-starting the engine. In vehicles that include a manual transmission, releasing a clutch pedal may be a trigger for engine auto-starting the engine. Other conditions that result auto-starting an engine after having been auto-stopped may include a battery state of charge in a hybrid vehicle being below a threshold value, the operation of a heating, ventilation, and air conditioning (HVAC) system, the slope or gradient of the road surface the vehicle is resting upon exceeding a threshold, etc.

The availability of an engine start/stop system may vary depending on certain inhibitors. For example, the engine start/stop system may be inhibited from starting and/or stopping the engine if the battery state of charge in a hybrid vehicle is above or below a threshold value, the HVAC is operating, a coolant temperature of the engine is above or below a threshold value, a steering wheel angle or a rate at which a steering wheel angle changes is above or below a threshold value, engagement or activation of transmission gear shifters, etc.

It may be desirable to ensure the engine is operating when a transmission gear shifter (which initiates a gear shift within the transmission) has been engaged. More specifically, it may be desirable to ensure the engine is operating when the transmission gear shifter has been engaged, because the engine may power a pump within the transmission which provides the hydraulic pressure needed to engage/disengage clutches within the transmission to affect the desired gear shift. Limiting or inhibiting the engine start/stop system, however, reduces fuel economy and increases emissions, which are otherwise increased and reduced, respectively, when the engine start/stop system is not limited or inhibited.

An engine start/stop system may be inhibited if the transmission gear shifter (including paddle shifters located on a steering wheel) is activated by the vehicle operator. For example, if the engine is running and the driver unintentionally activates the gear shifter, the engine may be inhibited from auto-stopping. On the other hand, if the engine is auto-stopped and the driver turns the steering wheel to pre-position the drive wheels prior to a launch and mistakenly activates the gear shifter, the engine will auto-start prematurely (e.g., before the release of a brake pedal or depression of an accelerator pedal). If the gear shifter includes one or more paddle shifters located on the steering wheel, it may be unlikely that an operator of the vehicle purposely intends to activate or engage the paddle shifter while simultaneously turning the steering wheel quickly. The current application provides a control solution for an engine start/stop system during such unintended activations or engagement of a transmission gear shifter, particularly transmission gear shifters that comprise paddle shifters located on the steering wheel.

Figure 2:
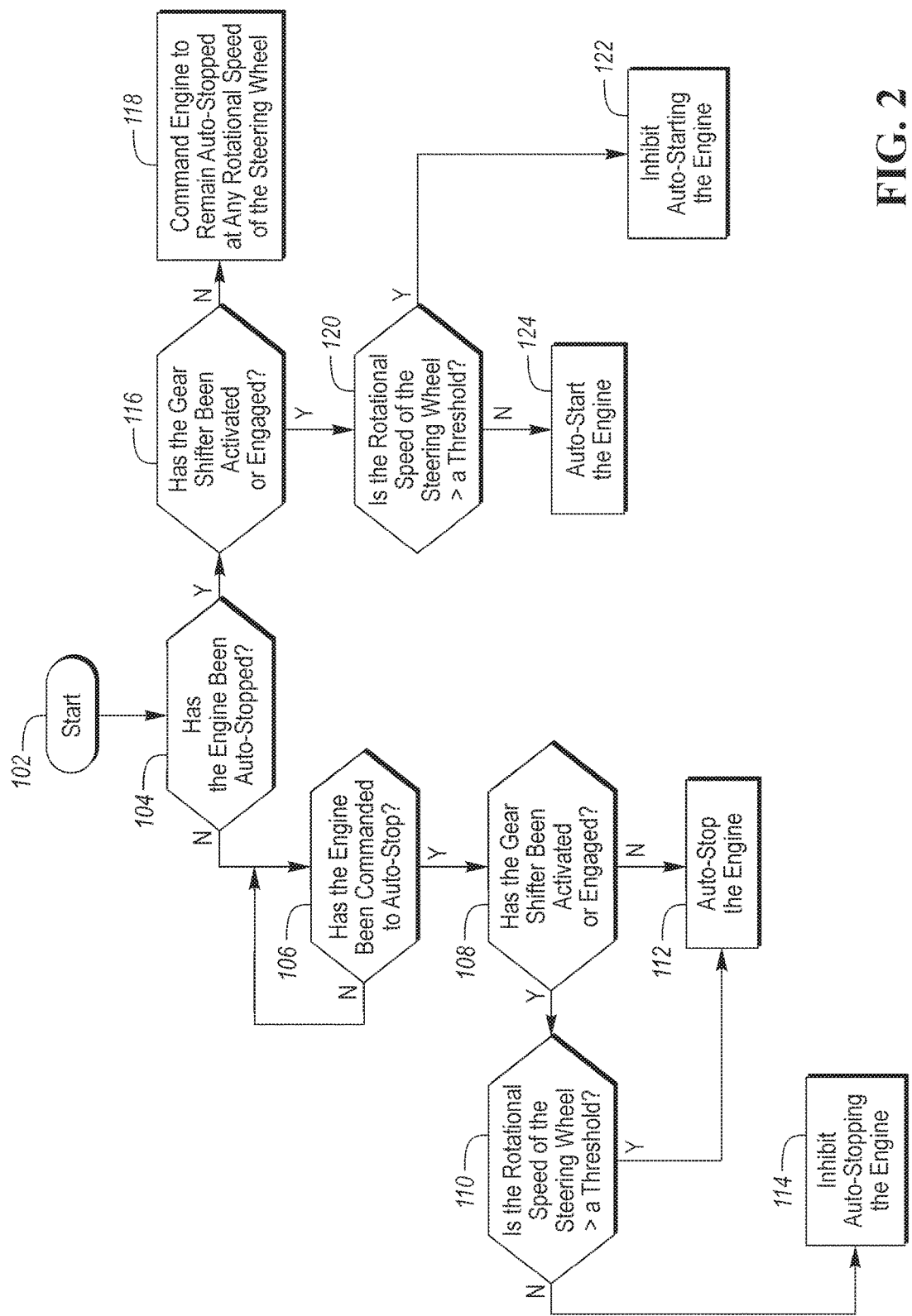
FIG. 2 is a flowchart illustrating a method of auto-stopping and auto-starting an engine in the vehicle.

Referring to FIG. 2, a method 100 of auto-stopping and auto-starting the engine 12 is illustrated. The method 100 may be stored as control logic and/or an algorithm within the controller 24. The controller 24 may implement the method 100 by controlling the various components of the vehicle 10. The method 100 is initiated at start block 102. Once the method 100 is initiated, the method 100 moves on to block 104 where it is determined if the engine 12 has been auto-stopped. If the engine 12 has not been auto-stopped, the method 100 moves on to block 106 where it is determined if the engine 12 has been commanded to auto-stop. The engine 12 may be commanded to auto-stop at block 106 in response to depression of the brake pedal 28. Alternatively, the engine 12 may be commanded to auto-stop at block 106 in response to release of the accelerator pedal 28. In yet another alternative, the engine may be commanded to auto-stop at block 106 in response to the combination of the brake pedal 28 being depressed and the vehicle 10 being stopped (i.e., having a zero velocity). If it is determined that the vehicle 10 has not been commanded to auto-stop at block 106, the method 100 recycles back to the beginning of block 106. If it is determined that the vehicle 10 has been commanded to auto-stop at block 106 the method 100 moves on to block 108.

At block 108, it is determined if the gear shifter 40 has been activated or engaged. If the gear shifter 40 has been activated or engaged, the method 100 moves on to block 110 where it is determined if the rotational speed of the steering wheel 34 is greater than a threshold. If the rotational speed of the steering wheel 34 is greater than the threshold, the method 100 moves on to block 112 where the engine 12 is commanded to auto-stop. Under such a scenario where the rotational speed of the steering wheel 34 is greater than the threshold, it is assumed that the gear shifter 40 was activated or engaged by mistake (i.e., it was not the intention of the vehicle operator to engage the gear shifter 40 to shift gears within the transmission 20). Therefore, the method 100 allows the engine 12 to auto-stop even though the gear shifter 40 has been activated or engaged. If the rotational speed of the steering wheel 34 is not greater than the threshold (i.e., the rotational speed of the steering wheel 34 is less than the threshold) at block 110, the method 100 moves on to block 114 where the engine 12 is inhibited from auto-stopping. Under such a scenario where the rotational speed of the steering wheel 34 is not greater than the threshold, it is assumed that it was the intention of the vehicle operator to activate or engage the gear shifter 40. Therefore, the method 100 inhibits the engine 12 from auto-stopping due to the operator's intention to activate or engage the gear shifter 40 to shift gears within the transmission 20. Returning to block 108, if it is determined that the gear shifter 40 has not been activated or engaged, the method 100 moves directly onto block 112, where the engine 12 is commanded to auto-stop, regardless of the rotational speed of the steering wheel 34 (i.e., the engine 12 is commanded to auto-stop at all rotational speeds of the steering wheel 34 responsive to the engine auto-stop command at block 106 and absent of activating or engaging the gear shifter 40 at block 108).

Returning to block 104, if it is determined that the engine has been auto-stopped, the method 100 moves on to block 116 where it is determined if the gear shifter 40 has been activated or engaged. If it is determined that the gear shifter 40 has not been activated or engaged at block 116, the method 100 moves on to block 118 where the engine 12 is commanded to remain auto-stopped at any rotational speed of the steering wheel 34 (i.e., the engine 12 is commanded to remain auto-stop at all rotational speeds of the steering wheel 34 responsive to the absence of activating or engaging the gear shifter 40 at block 116). Returning to block 116, if it is determined that the gear shifter 40 has been activated or engaged, the method 100 moves on to block 120 where it is determined if the rotational speed of the steering wheel 34 is greater than a threshold. If the rotational speed of the steering wheel 34 is greater than the threshold, the method 100 moves on to block 122 where the engine 12 is inhibited from auto-starting. Under such a scenario where the rotational speed of the steering wheel 34 is greater than the threshold, it is assumed that the gear shifter 40 was activated or engaged by mistake (i.e., it was not the intention of the vehicle operator to engage the gear shifter 40 to shift gears within the transmission 20). Therefore, the method 100 allows the engine 12 to remain auto-stopped even though the gear shifter 40 has been activated or engaged. If the rotational speed of the steering wheel 34 is not greater than the threshold (i.e., the rotational speed of the steering wheel 34 is less than the threshold) at block 120, the method 100 moves on to block 124 where the engine 12 is commanded to auto-start. Under such a scenario where the rotational speed of the steering wheel 34 is not greater than the threshold, it is assumed that it was the intention of the vehicle operator to activate or engage the gear shifter 40. Therefore, the method 100 auto-starts the engine 12 due to the operator's intention to activate or engage the gear shifter 40 to shift gears within the transmission 20, and since it desirable to ensure the engine 12 is operating during a shift within the transmission (see above).

The steering wheel rotational speed thresholds in blocks 110 and 120 may have the same value or different values. Furthermore, the threshold may have different values for different drive modes (e.g. Drive, Sport, Off-Road mode, etc.). It should be understood that the flowchart in FIG. 2 is for illustrative purposes only and that the method 100 should not be construed as limited to the flowchart in FIG. 2. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an engine;
    a steering wheel having a transmission gear shifter disposed thereon; and
    a controller programmed to,
        responsive to an engine auto-stop command, activating the gear shifter, and a rotational speed of the steering wheel being less than a threshold, inhibit auto-stopping the engine, and
        responsive to the engine auto-stop command, activating the gear shifter, and the rotational speed being greater than the threshold, auto-stop the engine.

2. The vehicle of claim 1, wherein the controller is further programmed to, responsive to activating the gear shifter and rotational speed being less than the threshold while the engine is auto-stopped, auto-start the engine.

3. The vehicle of claim 2, wherein the controller is further programmed to, responsive to activating the gear shifter and the rotational speed being greater than the threshold while the engine auto-stopped, inhibit auto-starting the engine.

4. The vehicle of claim 1, wherein the controller is further programmed to, responsive to the engine auto-stop command absent of activating the gear shifter, auto-stop the engine at all rotational speeds of the steering wheel.

5. The vehicle of claim 1, wherein the controller is further programmed to, responsive to rotation of the steering wheel at any rotational speed while the engine is auto-stopped absent of activating the gear shifter, command the engine to remain auto-stopped.

6. The vehicle of claim 1 further comprising a brake pedal, and wherein the controller is further programmed to, in response to depression of the brake pedal, generate the engine auto-stop command.

7. The vehicle of claim 1 further comprising an accelerator pedal, and wherein the controller is further programmed to, in response to release of the accelerator pedal, generate the engine auto-stop command.

8. A vehicle comprising:
    an engine;
    a steering wheel having a transmission gear shifter disposed thereon; and
    a controller programmed to,
        responsive to activating the gear shifter and a rotational speed of the steering wheel being less than a threshold while the engine is auto-stopped, auto-start the engine, and
        responsive to activating the gear shifter and the rotational speed being greater than the threshold while the engine is auto-stopped, inhibit auto-starting the engine.

9. The vehicle of claim 8, wherein the controller is further programmed to, responsive to an engine auto-stop command, activating the gear shifter, and the rotational speed of the steering wheel being less than the threshold, inhibit auto-stopping the engine.

10. The vehicle of claim 9, wherein the controller is further programmed to, responsive to the engine auto-stop command, activating the gear shifter, and the rotational speed being greater than the threshold, auto-stop the engine.

11. The vehicle of claim 10 further comprising a brake pedal, and wherein the controller is further programmed to, in response to depression of the brake pedal, generate the engine auto-stop command.

12. The vehicle of claim 10 further comprising an accelerator pedal, and wherein the controller is further programmed to, in response to release of the accelerator pedal, generate the engine auto-stop command.

13. The vehicle of claim 8, wherein the controller is further programmed to, responsive to the engine auto-stop command absent of activating the gear shifter, auto-stop the engine at all rotational speeds of the steering wheel.

14. The vehicle of claim 8, wherein the controller is further programmed to, responsive to rotation of the steering wheel at any rotational speed while the engine is auto-stopped absent of activating the gear shifter, command the engine to remain auto-stopped.

15. The vehicle of claim 8, wherein the transmission gear shifter includes a pair of paddle shifters.

16. A vehicle start/stop method comprising:
- inhibiting auto-stopping an engine responsive to an engine auto-stop command, activating a transmission gear shifter, and a rotational speed of a steering wheel being less than a threshold;
- auto-stopping the engine responsive to the engine auto-stop command, activating the gear shifter, and the rotational speed being greater than the threshold;
- auto-starting the engine responsive to activating the gear shifter and the rotational speed being less than the threshold while the engine is auto-stopped; and
- inhibiting auto-starting the engine responsive to activating the gear shifter and the rotational speed being greater than the threshold while the engine is auto-stopped.

17. The method of claim 16, further comprising auto-stopping the engine at all rotational speeds of the steering wheel, responsive to the engine auto-stop command absent of activating the gear shifter.

18. The method of claim 17 further comprising commanding the engine to remain auto-stopped responsive to rotation of the steering wheel at any rotational speed while the engine is auto-stopped absent of activating the gear shifter.

19. The method of claim 16 further comprising generating the engine auto-stop command responsive to depression of a brake pedal.

20. The method of claim 16 further comprising generating the engine auto-stop command responsive to release of an accelerator pedal.

* * * * *